United States Patent [19]

Willi et al.

[11] Patent Number: 6,095,102
[45] Date of Patent: Aug. 1, 2000

[54] DUAL FUEL ENGINE WHICH CREATES A SUBSTANTIALLY HOMOGENEOUS MIXTURE OF GASEOUS FUEL, AIR, AND PILOT FUEL DURING A COMPRESSION STROKE

[75] Inventors: Martin L. Willi; Min Wu, both of Lafayette, Ind.

[73] Assignee: Caterpillar Inc., Peoria, Ill.

[21] Appl. No.: 09/165,477

[22] Filed: Oct. 2, 1998

[51] Int. Cl.$^7$ .............................. F02B 7/08; F02D 41/14
[52] U.S. Cl. ..................................... 123/27 GE; 123/431
[58] Field of Search .............................. 123/27 GE, 304, 123/299, 300, 525, 431

[56] References Cited

U.S. PATENT DOCUMENTS

| | | | |
|---|---|---|---|
| 4,524,730 | 6/1985 | Doell et al. | 123/27 GE |
| 4,527,516 | 7/1985 | Foster | 123/27 GE |
| 4,603,674 | 8/1986 | Tanaka | 123/575 |
| 4,708,094 | 11/1987 | Helmich et al. | 123/27 GE |
| 4,754,733 | 7/1988 | Steiger | 123/299 |
| 4,831,993 | 5/1989 | Kelgard | 123/525 |
| 5,139,002 | 8/1992 | Lynch et al. | 123/575 |
| 5,315,973 | 5/1994 | Hill et al. | 123/304 |
| 5,365,902 | 11/1994 | Hsu | 123/299 |
| 5,450,829 | 9/1995 | Beck | 123/435 |
| 5,515,829 | 5/1996 | Wear et al. | 123/446 |
| 5,669,464 | 9/1997 | Earleson | 184/1.5 |
| 5,676,106 | 10/1997 | Hoffman, II et al. | 123/196 S |

FOREIGN PATENT DOCUMENTS 8-158923  6/1996  Japan .

OTHER PUBLICATIONS

R.H. Thring, Homogeneous–Charge Compression–Ignition (HCCI) Engines. Southwest Research Institute, pp. 1–7.

J.Ray Smith, Salvador M. Aceves, Charles Westbrook and William Pitz, Modeling of Homogeneous Charge Compression Ignitions (HCCI) of Methane, 1997.

L.J. Spadaccini and M. B. Colkett III, Ignitions Delay Characteristics of Methane Fuels Jul. 22, 1994.

Keiichi Makagome, Naoki Shimazaki, and Keiichi Niimura, Shinji Kobayashi Combustion and Emission Characteristics of premixed Lean Diesel Combusiton Engine. ©1997 Society of Automotive Engineers, Inc.

Edward F. Obert, Internal Combustion Engines and Air Pollution ©1973 by Harper & Row, Publishers, Inc.

David E. Foster, Paul M. Nagt Compression–Ignited Homogeneous Charge Combustion ©1983 Society of Automotive Engineers, Inc.

V.M. Zamansky and A.A. Borisov Promotion of High–Temperature Self–Ignition, Nov. 21, 1991.

Yoshinaka Takeda, Nakagome Keiichi, and Niimura Keiichi Emission Characteristics of Premixed Lean Diesel Combustion with Extremely Early Staged Fuel Injection. ©1996 Society of Automotive Engineers.

Thomas W. Ryan III and Timothy J. Callahan, Homogeneous Charge Compression Ignition of Diesel Fuel ©1996 Society of Automotive Engineers Inc.

*Primary Examiner*—Andrew M. Dolinar
*Attorney, Agent, or Firm*—Maginot, Addison & Moore

[57] ABSTRACT

A method of operating an engine assembly having a cylinder assembly which defines a combustion chamber is disclosed. The cylinder assembly includes an engine block having a piston cylinder defined therein, a piston which translates in the piston cylinder, and a crankshaft which is mechanically coupled to the piston. The method includes the steps of performing an intake stroke of the engine assembly and advancing gaseous fuel and air into the combustion chamber during the intake stroke performing step. The method further includes the step of performing a compression stroke of the engine assembly after the is intake stroke performing step. The method yet further includes the step of injecting a pilot fuel into the combustion chamber during the compression stroke while the crankshaft is positioned at about X degrees before top dead center, wherein $21.0<X<28.0$. The method further includes the step of combusting the pilot fuel in the combustion chamber during the compression stroke performing step so as to ignite the gaseous fuel. An engine assembly is also disclosed.

18 Claims, 2 Drawing Sheets

DUAL FUEL ENGINE WHICH CREATES A SUBSTANTIALLY HOMOGENEOUS MIXTURE OF GASEOUS FUEL, AIR, AND PILOT FUEL DURING A COMPRESSION STROKE

TECHNICAL FIELD OF THE INVENTION

The present invention relates generally to a dual fuel engine, and more specifically to dual fuel engine which creates a substantially homogeneous mixture of gaseous fuel, air, and pilot fuel during a compression stroke.

BACKGROUND OF THE INVENTION

Natural gas has several advantages over other hydrocarbon fuels that are combusted in internal combustion engines. For example, natural gas is less expensive relative to other hydrocarbon fuels. Moreover, natural gas burns cleaner during operation of the internal combustion engine relative to other hydrocarbon fuels. By burning cleaner, a reduced amount of combustion byproducts such as carbon monoxide, oxides of nitrogen, and hydrocarbons are released into the environment during operation of the internal combustion engine. In addition, because lubricants of the internal combustion engine become contaminated with combustion byproducts over a time period, the production of a reduced amount of combustion byproducts results in less contamination of the lubricants over the time period thereby increasing the useful life of the lubricants.

One type of internal combustion engine is a diesel engine. Diesel engines combust fuel by compressing a mixture of air and fuel to a point where the fuel is ignited by heat which results from such compression. When natural gas is used as a fuel in a diesel engine, the natural gas does not readily ignite as it is compressed. In order to overcome this problem, an ignition source is provided to ignite the natural gas. The ignition source may be provided by a spark plug similar to those used in spark ignition engines. However, in certain types of diesel engines (e.g. dual fuel engines), the ignition source is provided by injecting a small amount of diesel fuel, or pilot fuel, into a mixture of air and natural gas (or other gaseous fuel). As the mixture of air, natural gas, and pilot fuel is compressed, the pilot fuel ignites, which in turn ignites the natural gas.

A disadvantage associated with using pilot fuel as an ignition source is the resulting generation of an increased amount of oxides of Nitrogen ($NO_X$). In particular, the ratio of air to fuel (both natural gas and pilot fuel) in the combustion chamber varies with the proximity to the injected streams of pilot fuel. Rich mixtures are combusted near the injected streams of pilot fuel, while lean mixtures are combusted away from the injected streams of pilot fuel. Combustion of the rich mixtures tend to produce more $NO_X$ than does the combustion of a the lean mixtures.

One way to reduce the amount of $NO_X$ produced during the combustion process is to create a lean homogeneous mixture of air, natural gas, and pilot fuel throughout the combustion chamber prior to ignition of the pilot fuel. Because the homogeneous mixture is lean throughout the entire combustion chamber, only lean mixtures are combusted. Combusting only lean mixtures produces a lesser quantity of $NO_X$ than does combusting a combination of rich mixtures and lean mixtures.

What is needed therefore is a dual fuel engine which produces a lean homogeneous mixture of gaseous fuel, air, and pilot fuel in the combustion chamber prior to initiating the combustion process.

DISCLOSURE OF THE INVENTION

In accordance with a first embodiment of the present invention, there is provided a method of operating an engine assembly having a cylinder assembly which defines a combustion chamber. The cylinder assembly includes an engine block having a piston cylinder defined therein, a piston which translates in the piston cylinder, and a crankshaft which is mechanically coupled to the piston. The method includes the steps of performing an intake stroke of the engine assembly and advancing gaseous fuel and air into the combustion chamber during the intake stroke performing step. The method further includes the step of performing a compression stroke of the engine assembly after the intake stroke performing step. The method yet further includes the step of injecting a pilot fuel into the combustion chamber during the compression stroke while the crankshaft is positioned at about X degrees before top dead center, wherein 21.0<X<28.0. The method further includes the step of combusting the pilot fuel in the combustion chamber during the compression stroke performing step so as to ignite the gaseous fuel.

In accordance with a second embodiment of the present invention, there is provided a method of operating an engine assembly having a cylinder assembly which defines a combustion chamber. The cylinder assembly an engine block having a piston cylinder defined therein, a piston which translates in the piston cylinder, and a crankshaft which is mechanically coupled to the piston. The engine assembly further includes an exhaust conduit in fluid communication with the combustion chamber, and a $NO_X$ sensor positioned to measure $NO_X$ content of exhaust gases in the exhaust conduit. The method includes the steps of performing an intake stroke of the engine assembly, advancing gaseous fuel and air into the combustion chamber during the intake stroke performing step, performing a compression stroke of the engine assembly after the intake stroke performing step, injecting a pilot fuel into the combustion chamber during the compression stroke, and combusting the pilot fuel in the combustion chamber during the compression stroke performing step so as to ignite the gaseous fuel. The method further includes the steps of performing a first exhaust stroke of the engine assembly during a first cycle of the engine assembly so as to advance first exhaust gases from the combustion chamber to the exhaust conduit and measuring NO content of the first exhaust gases in the exhaust conduit after the first exhaust stroke performing step to obtain a first measured $NO_X$ value. The method yet further includes the steps of performing a second exhaust stroke of the engine assembly during a second cycle of the engine assembly so as to advance second exhaust gases from the combustion chamber to the exhaust conduit and measuring $NO_X$ content of the second exhaust gases in the exhaust conduit after the second exhaust stroke performing step to obtain a second measured $NO_X$ value. If the first measured $NO_X$ value has a first predetermined relationship to the second measured $NO_X$ value, then method further includes the step of maintaining timing of when the pilot fuel is injected into the combustion chamber during a subsequent compression stroke of a third cycle of the engine assembly. If the first measured $NO_X$ value has a second predetermined relationship to the second measured $NO_X$ value, then the method further includes the step of adjusting timing of when the pilot fuel is injected into the combustion chamber during the subsequent compression stroke of the third cycle of the engine assembly.

In accordance with a third embodiment of the present invention, there is provided an engine assembly which includes a cylinder assembly which includes an engine block having a piston cylinder defined therein, an engine head secured to said engine block, and a piston which translates within said piston cylinder. The engine block, said engine head, and said piston cooperate to define a combustion chamber. The engine assembly further includes an exhaust conduit positioned in fluid communication with said combustion chamber and a gaseous fuel source positioned in fluid communication with said combustion chamber during an intake stroke of said engine assembly. The engine assembly yet further includes a fuel injector positioned in said engine head and operable to inject pilot fuel into said combustion chamber during a compression stroke of said engine assembly. The engine assembly further includes a $NO_X$ sensor positioned to measure $NO_X$ content of exhaust gases advanced from said combustion chamber to said exhaust conduit during an exhaust stroke of said engine assembly. The $NO_X$ sensor is operable to generate a plurality of measured $NO_X$ signals in response to sensing $NO_X$ content of said exhaust gases. The engine assembly yet further includes a controller which adjusts timing of when said fuel injector injects pilot fuel into said combustion chamber based on said plurality of measured $NO_X$ signals.

BEST MODE FOR CARRYING OUT THE INVENTION

Figure 1:
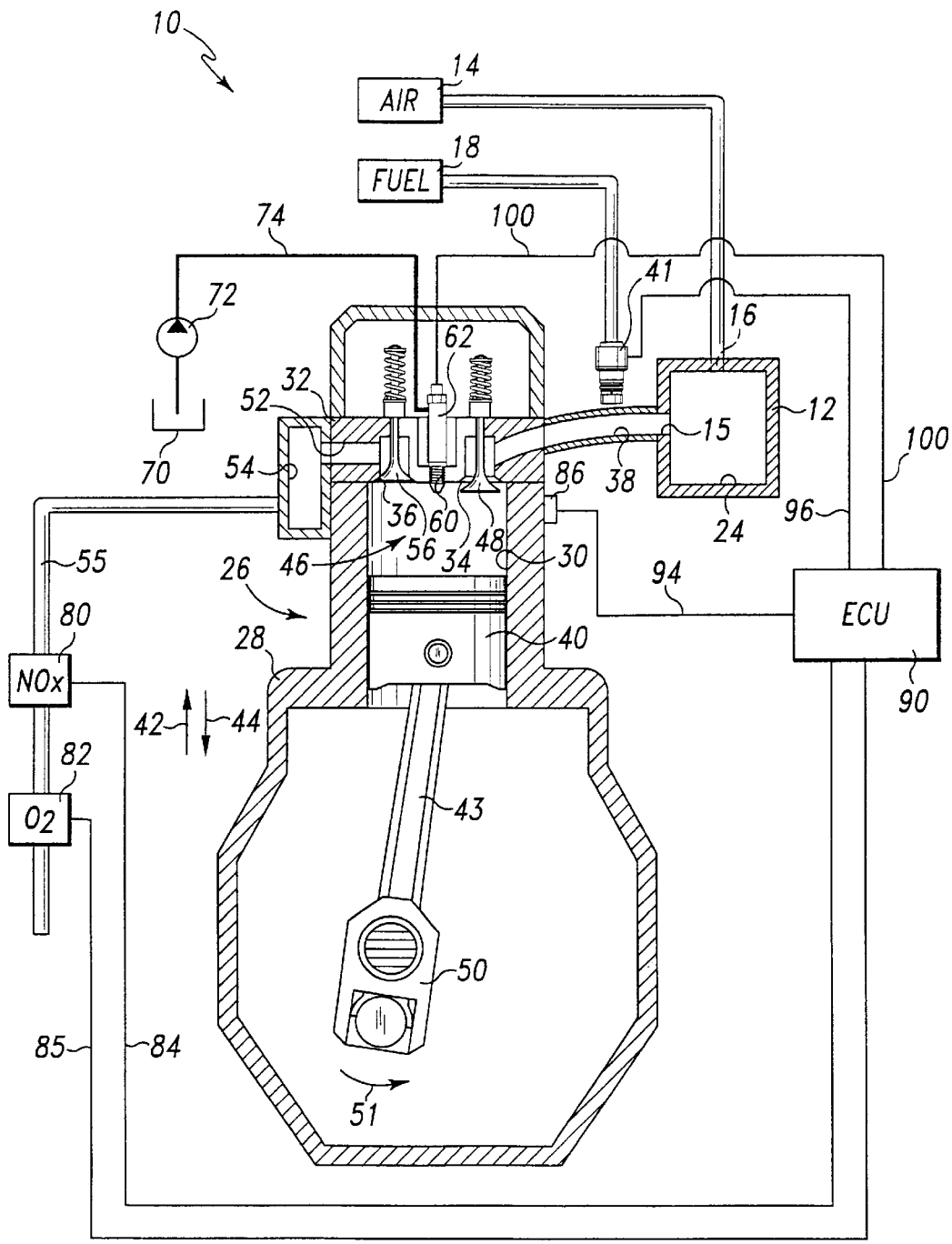
FIG. 1 is a partial cross sectional, partial schematic view of a dual fuel engine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an engine assembly 10. The engine assembly 10 includes a plenum member 12, and an air source 14. The plenum member 12 has an inlet opening 16, and an exit opening 15 defined therein. The air source 14 supplies air to the inlet opening 16. Air from the air source 14 advances into a plenum chamber 24 defined in the plenum member 12 via the inlet opening 16.

The engine assembly 10 further includes a cylinder assembly 26. The cylinder assembly 26 includes a block 28 having a piston cylinder 30 defined therein. An engine head 32 is secured to the block 28. The engine head 32 has an intake port 34, an exhaust port 36, and a fuel injector opening 60 defined therein. An intake conduit 38 places the intake port 34 in fluid communication with the exit opening 15 of the plenum member 12. An exhaust conduit 52 places the exhaust port 36 in fluid communication with an exhaust manifold 54.

The engine assembly 10 further includes a piston 40 which translates in the piston cylinder 30 in the general direction of arrows 42 and 44. As the piston 40 moves downwardly in the general direction of arrow 44 to the position shown in FIG. 1, a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to the uppermost position (not shown).

The piston 40, the piston cylinder 30, and the engine head 32 cooperate so as to define a combustion chamber 46. In particular, when the piston 40 is advanced in the general direction of arrow 42, the volume of the combustion chamber 46 is decreased.

On the other hand, when the piston 40 is advanced in the general direction of arrow 44, the volume of the combustion chamber 46 is increased as shown in FIG. 1.

The engine assembly 10 further includes a gaseous fuel source 18 in fluid communication with the intake conduit 38. A gaseous fuel supply valve 41 controls the amount of gaseous fuel, such as natural gas, advanced to the intake conduit 38. In particular, the gaseous fuel supply valve 41 moves between an open position, which advances gaseous fuel to the intake conduit 38, and a closed position, which prevents advancement of gaseous fuel to the intake conduit 38. It should be appreciated that the amount of gaseous fuel advanced by the gaseous fuel valve 41 controls the ratio of air to gaseous fuel, or air-fuel ratio, advanced to the combustion chamber 46. Specifically, if it is desired to advance a leaner mixture to the combustion chamber 46, a gaseous fuel control signal received via a signal line 96 causes the gaseous fuel supply valve 41 to operated so as to advance less gaseous fuel to the intake conduit 38. On the other hand, if it is desired to advance a richer mixture of air and gaseous to the combustion chamber 46, a gaseous fuel control signal received via the signal line 96 causes the gaseous fuel supply valve 41 to operated so as to advance more gaseous fuel to the intake conduit 38.

An intake valve 48 selectively places the plenum chamber 24 in fluid communication with the combustion chamber 46. The intake valve 48 is actuated in a known manner by a camshaft (not shown), a pushrod (not shown), and a rocker arm (not shown) driven by rotation of the crankshaft 50. When the intake valve 48 is placed in the open position (shown in FIG. 1) air and gaseous fuel are advanced from the intake conduit 38 to the combustion chamber 46 via the intake port 34. When the intake valve 48 is placed in the closed position (not shown) gaseous fuel and air are prevented from advancing from the intake conduit 38 to the combustion chamber 46 since the intake valve 48 blocks fluid flow through the intake port 34.

An exhaust valve 56 selectively places the exhaust manifold 54 in fluid communication with the combustion chamber 46. The exhaust valve 56 is actuated in a known manner by a camshaft (not shown), a pushrod (not shown), and a rocker arm (not shown) each of which are driven by the rotation of the crankshaft 50. When the exhaust valve 56 is placed in the open position (not shown) exhaust gases are advanced from the combustion chamber 46 to the exhaust manifold 54 via a fluid path that includes the exhaust port 36 and the exhaust passage 52. From the exhaust manifold 54, exhaust gases are advanced to an exhaust conduit 55. When the exhaust valve 56 is placed in the closed position (shown in FIG. 1) exhaust gases are prevented from advancing from the combustion chamber 46 to the exhaust manifold 54 since the exhaust valve 56 blocks fluid flow through the exhaust port 36.

Combustion of the mixture of gaseous fuel and air in the combustion chamber 46 produces a number of exhaust gases. After the mixture of gaseous fuel and air is combusted in the combustion chamber 46, exhaust gases are advanced through the exhaust conduit 55. A $NO_X$ sensor 80 is positioned within the exhaust conduit 55 to measure the amount of $NO_X$ in the exhaust gases. The $NO_X$ sensor 80 measures the amount of $NO_X$ in the exhaust conduit 55 and generates a measured $NO_X$ value in response thereto. An oxygen sensor 82 is also positioned within the exhaust conduit 55 to measure the amount of oxygen in the exhaust gases. The oxygen sensor 82 measures the amount of oxygen in the exhaust conduit 55 and generates an oxygen content signal in response thereto.

The engine assembly 10 further includes a detonation sensor 86. The detonation sensor 86 is secured to the engine block 28 proximate to the engine head 32. The detonation sensor 86 is operable to detect vibrations caused during combustion of gaseous fuel and air in the combustion chamber 46 and generate detonation signals in response thereto. A normal detonation signal is generated when the cylinder assembly 26 is working in a normal mode of operation and an abnormal detonation signal is generated when the cylinder assembly 26 is working in an abnormal mode of operation.

In order to provide meaning to the phrase "normal mode of operation" as it is used herein, it should be understood that the cylinder assembly 26 is operating in a normal mode of operation when the combustion of gaseous fuel and air in the combustion chamber 46 produces a gradual pressure rise within the combustion chamber 46. This gradual pressure rise generates normal vibrations in the combustion chamber 46 which are within the design parameters of the cylinder assembly 26. The detonation sensor 86 detects normal vibrations and generates the normal detonation signal in response thereto.

Moreover, in order to provide meaning to the phrase "abnormal mode of operation" as it is used herein, it should be understood that the cylinder assembly 26 is operating in an abnormal mode of operation where combustion of gaseous fuel and air in the combustion chamber 46 generates rapid pressure rise within the combustion chamber 46. This rapid pressure rise generates a severe vibration in the combustion chamber 46 which is detected by the detonation sensor 86. Heat and pressure generated during the abnormal mode of operation can potentially damage the piston 40, the engine block 28, or the engine head 32 of the cylinder assembly 26. The detonation sensor 86 detects severe vibrations and generates the abnormal detonation signal in response thereto.

The engine assembly 10 further includes a fuel reservoir 70. A fuel pump 72 draws low pressure fuel from the fuel reservoir 70 and advances high pressure fuel to a fuel injector 62 via a fuel line 74. The fuel injector 62 is positioned in the injector opening 60 and is operable to inject a quantity of fuel into the combustion chamber 46 through the injector opening 60. In particular, the fuel injector 62 injects fuel into the combustion chamber 46 upon receipt of an injector control signal on a signal line 100. Furthermore, the fuel can be any one of the following group of fuels: diesel fuel, crude oil, lubricating oil, or an emulsion of water and diesel fuel.

The engine assembly 10 further includes a controller or engine control unit 90. The engine control unit 90 is operable to receive (i) measured $NO_X$ values from the $NO_X$ sensor 80 via the signal line 84, (ii) oxygen content signals from the oxygen sensor 82 via the signal line 85, and (iii) detonation signals from the detonation sensor 86 via the signal line 94.

The engine control unit 90 then generates injector control signals which are sent to the fuel injector 62 via the signal line 100 in response to receiving the measured $NO_X$ values, oxygen content signals, and detonation signals. The injector control signals control the timing and quantity of fuel injected by the fuel injector 62 into the combustion chamber 46. The engine control unit 90 also generates gaseous fuel control signals in response to receiving the measured $NO_X$ values, oxygen content signals, and detonation signals. The gaseous fuel control signals are sent to the gaseous fuel supply valve 41 via the signal line 96. The gaseous fuel control signals cause the gaseous fuel supply valve 41 to control the air-fuel ratio of air and gaseous fuel mixture advanced to the combustion chamber 46, as described above.

INDUSTRIAL APPLICABILITY

In operation, the engine assembly 10 operates in a four stroke cycle which includes an intake stroke, a compression stroke, a power stroke, and an exhaust stroke. The first stroke is the intake stroke, during which the exhaust valve 56 is positioned in the closed position and the intake valve 48 is positioned in the open position as shown in FIG. 1. During the intake stroke, the piston 40 is advanced downwardly in the general direction of arrow 44 thereby creating a low pressure in the combustion chamber 46. This low pressure draws gaseous fuel and air from the intake conduit 38 downwardly into the combustion chamber 46 so as to form a homogeneous mixture of air and gaseous fuel in the combustion chamber 46.

Advancing to the compression stroke, the intake valve 48 and the exhaust valve 56 are both positioned in their respective closed positions. As the piston 40 moves upwardly in the general direction of arrow 42, it compresses gaseous fuel and air in the combustion chamber 46. At a time during the compression stroke, the fuel injector 62 injects pilot fuel into the combustion chamber 46 so as to ignite the mixture of gaseous fuel and air.

Figure 2:
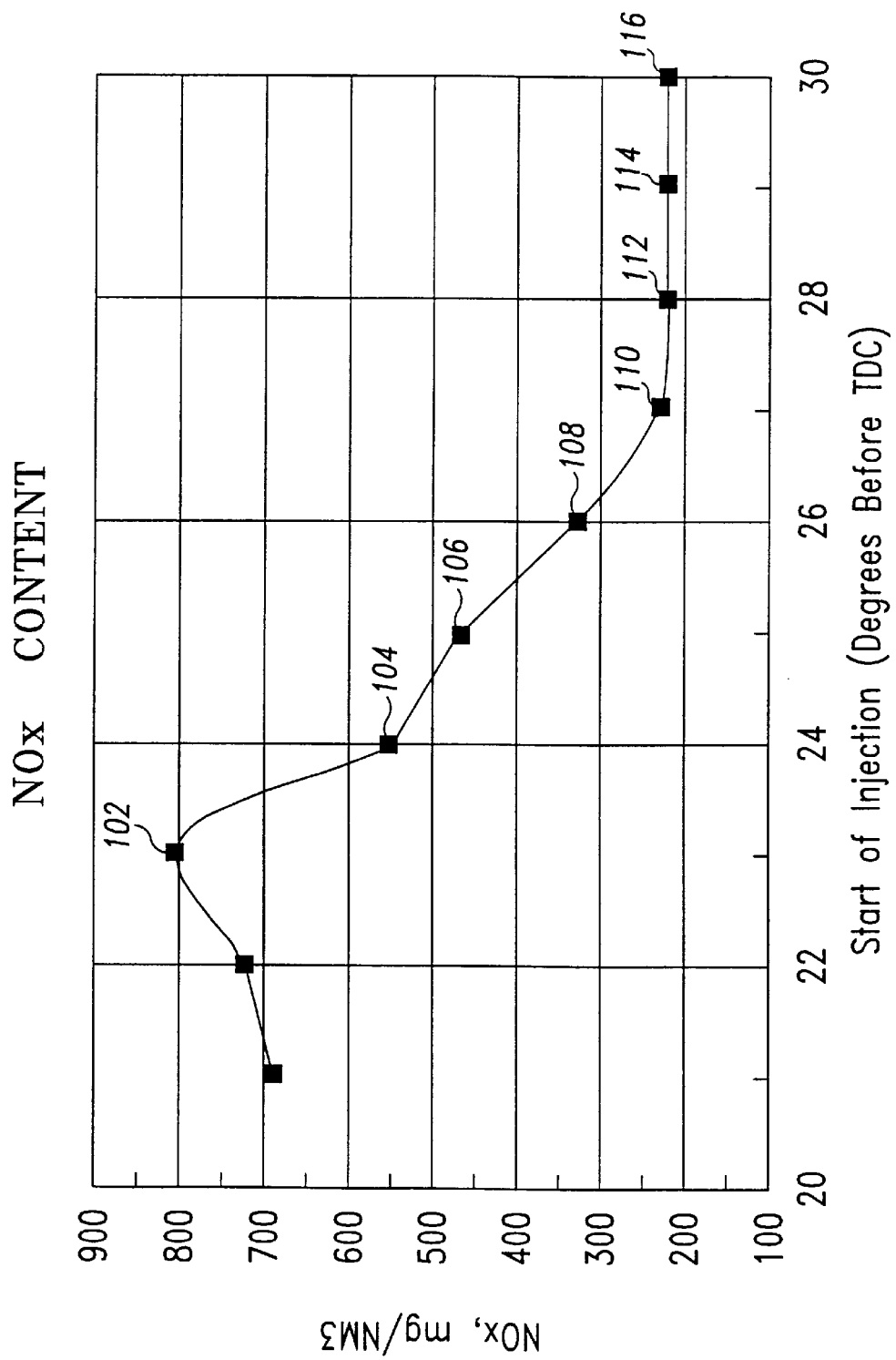
FIG. 2 is a graph which illustrates the variation in measured $NO_X$ values as the timing of the pilot fuel injection is varied.

Referring now to FIG. 2, there is shown a graphic representation of measured $NO_X$ values obtained from the exhaust gases in the exhaust conduit 55 versus the timing of the pilot fuel injection for an exemplary dual fuel engine. It should be appreciated that a maximum measured $NO_X$ value occurs at a point 102 when the pilot fuel is injected at about twenty three degrees before top dead center (TDC) during the compression stroke. Top dead center is the rotational position of the crankshaft 50 which places the piston 40 in the uppermost or top position in the general direction of arrow 42. It should be appreciated that the four stroke cycle is completed with two revolutions of the crankshaft 50. Therefore, each stroke of the four stroke cycle is completed in one half a revolution (or 180 degrees) of the crankshaft 50. The crankshaft 50 is positioned in the top dead center position at the end of the compression stroke and at the end of the exhaust stroke.

As the injection of the pilot fuel is advanced, i.e. injected at a point earlier in the compression stroke, the measured $NO_X$ value decreases. In particular, as the timing of the pilot fuel injection is advanced to twenty four degrees before TDC, the measured $NO_X$ value drops to the point represented by point 104. Similarly, at twenty five degrees before TDC the measured $NO_X$ value drops to point 106, at twenty six degrees before TDC the measured $NO_X$ value drops to point 108, and at twenty seven degrees before TDC the measured $NO_X$ value drops to a point 110.

Subsequently, further advancement of the timing of the pilot fuel injection does not reduce the measured $NO_X$ value significantly from the measured $NO_X$ value achieved by injecting the pilot fuel at twenty seven degrees before TDC. In particular, the measured $NO_X$ value at twenty eight degrees before TDC represented by point 112, measured $NO_X$ value at twenty nine degrees before TDC represented by point 114, and measured $NO_X$ value at thirty degrees before TDC represented by point 116 are all substantially identical to the measured $NO_X$ value represented by point 110.

The reason that the measured $NO_X$ value is reduced from the point 102 to the point 110 as the timing of the pilot fuel injection is advanced from twenty three degrees to twenty seven degrees is that the pilot fuel is able to mix with the gaseous fuel and air present in the combustion chamber 46 to form a more homogeneous mixture of pilot fuel, gaseous fuel, and air prior to ignition of the pilot fuel. It should be appreciated that as the timing of the pilot fuel injection is advanced, a greater portion of the pilot fuel becomes mixed with the gaseous fuel and air to create an increasingly homogeneous mixture. It should further be appreciated that the creation of the increasingly homogeneous mixture of gaseous fuel, air, and pilot fuel provides a larger number of ignition sources for the gaseous fuel as the pilot fuel is more evenly distributed throughout the combustion chamber 46 prior to being ignited. As the number of ignitions sources increases, lean mixtures throughout the combustion chamber 46 are combusted which results in low measured $NO_X$ values in exhaust gases in the exhaust conduit 55.

However, it should be noted that advancing the injection of the pilot fuel beyond twenty seven degrees before TDC does little to reduce the measured $NO_X$ value of the exhaust gases. In particular, injecting the pilot fuel at any point prior to twenty seven degrees before TDC results in roughly the same measured $NO_X$ value as injecting the pilot fuel at twenty seven degrees before TDC. Further advancing the timing of the pilot fuel injection does not improve mixing of the pilot fuel with the gaseous fuel and air.

Injecting the pilot fuel at twenty seven degrees before TDC produces a substantially homogeneous mixture of pilot fuel, gaseous fuel, and air before the pilot fuel is ignited. Any further advancement of the pilot fuel injection produces a similar substantially homogeneous mixture of pilot fuel, gaseous fuel, and air which, when ignited, results in a similar measured $NO_X$ value of the exhaust gases.

Therefore, when operating the engine assembly 10 under conditions similar to the exemplary conditions of FIG. 2, the engine control unit 90 would send injector control signals to the fuel injector 62 causing the fuel injector 62 to inject fuel into the combustion chamber 46 at about twenty seven degrees before TDC.

However, engine operating conditions dynamically change with changes in engine speed, engine load, intake temperature, intake pressure and other parameters. To adjust the injection of the pilot fuel for an operating condition different from, but similar to, the exemplary operating condition shown in FIG. 2, the engine control unit 90 varies the timing of the pilot fuel injection over a range from about twenty one degrees before TDC to about twenty eight degrees before TDC. Injection of the pilot fuel is prevented for over a range from about zero degrees before TDC to about twenty degrees before TDC.

To adjust the timing of the pilot fuel injection for other operating conditions, a first cycle and a second cycle of the engine assembly 10 are performed. A first measured $NO_X$ value is obtained from exhaust gases in the exhaust conduit 55 after the first cycle, and a second measured $NO_X$ value is obtained from exhaust gases in the exhaust conduit 55 after the second cycle. The first measured $NO_X$ value and the second measured $NO_X$ value are then compared. If the first measured $NO_X$ value and the second measured $NO_X$ value have a first predetermined relationship, then the timing of pilot fuel injection of a subsequent third cycle is maintained at the timing of the pilot fuel injection of the first cycle. If the first measured $NO_X$ value and the second measured $NO_X$ value have a second predetermined relationship, then the timing of pilot fuel injection is adjusted for the subsequent third cycle.

The first predetermined relationship would correspond to operating the engine assembly 10 at a transition point similar to the point 110. At the transition point, any advancement of the pilot fuel injection produces a negligible reduction in the measured $NO_X$ value of the exhaust gases advanced to the exhaust conduit 55. However, any retarding of the pilot fuel injection results in an increase in the measured $NO_X$ value of the exhaust gases in the exhaust conduit 55. Therefore, when comparing the first measured $NO_X$ value to the second measured $NO_X$ value, if the timing of the pilot fuel injection of the second cycle is more advanced than the timing of pilot fuel injection of the first cycle and the second measured $NO_X$ value is substantially similar to the first measured $NO_X$ value, then the timing of the pilot fuel injection of the third cycle is maintained at the timing of the pilot fuel injection of the first cycle. This is similar to a first cycle which produces a first measured $NO_X$ value similar to point 110, and a second cycle which produces a second measured $NO_X$ value similar to point 112.

Similarly, when comparing the first measured $NO_X$ value to the second measured $NO_X$ value, if the timing pilot fuel injection of the second cycle is more retarded (or injected at a point later in the compression stroke) than the timing of pilot fuel injection of the first cycle and the second measured $NO_X$ value is substantially greater than the first measured $NO_X$ value, then the timing of the pilot fuel injection of the third cycle is maintained at the timing of the pilot fuel injection of the first cycle. This is similar to a first cycle which produces a first measured $NO_X$ value similar to point 110, and a second cycle which produces a second measured $NO_X$ value similar to point 108.

The second predetermined relationship would correspond to operating the engine assembly 10 at a point dissimilar to operating at the point 110. Therefore, when comparing the first measured $NO_X$ value to the second measured $NO_X$ value, if the timing of the pilot fuel injection of the second cycle is more advanced than the timing of pilot fuel injection of the first cycle and the second measured $NO_X$ value is substantially lesser than the first measured $NO_X$ value, then the timing of the pilot fuel injection of the third cycle is adjusted to advance the timing from the timing of the pilot fuel injection of the first cycle. This is similar to a first cycle which produces a first measured $NO_X$ value similar to point 108, and a second cycle which produces a second measured $NO_X$ value similar to point 110. The pilot fuel injection is advanced to move the operation of the engine assembly 10 toward a transition point similar to the point 110.

Similarly, when comparing the first measured $NO_X$ value to the second measured $NO_X$ value, if the pilot fuel injection of the second cycle is more retarded than the timing of pilot fuel injection of the first cycle and the second measured $NO_X$ value is substantially equal to the first measured $NO_X$ value, then the timing of the pilot fuel injection of the third cycle is adjusted to retard the timing from the timing of the pilot fuel injection of the first cycle. This is similar to a first cycle which produces a first measured $NO_X$ value similar to point 112, and a second cycle which produces a second measured $NO_X$ value similar to point 110. The pilot fuel injection is retarded to move the operation of the engine assembly 10 toward a transition point similar to the point 110.

Furthermore, the engine control unit 90 monitors the signal line 94 for the abnormal detonation signal from the detonation sensor 86. Upon receipt of an abnormal detonation signal from the detonation sensor 86, the engine control unit 90 can (i) send an injection control signal to the fuel injector 62 causing the fuel injector 62 to either advance or retard the timing of the pilot fuel injection, (ii) send an injection control signal to the fuel injector 62 causing the fuel injector 62 to either increase or decrease the quantity of pilot fuel injected by the fuel injector 62, or (iii) send a gaseous fuel control signal to the gaseous fuel supply valve 41 to either create a leaner or richer mixture of gaseous fuel that is advanced to the combustion chamber 46 on a subsequent intake stroke.

Moreover, the engine control unit 90 monitors the signal line 84 for the oxygen content signals from the oxygen sensor 82. Upon receipt of an oxygen content signal showing a reduced amount of oxygen in the exhaust conduit 55, the engine control unit 90 sends a gaseous fuel control signal to the gaseous fuel control valve 41 causing the gaseous fuel control valve 41 to advance a leaner mixture to the intake conduit 38. On the other hand, upon receipt of an oxygen content signal showing an excess oxygen in the exhaust conduit 55, the engine control unit 90 sends a gaseous fuel control signal to the gaseous fuel control valve 41 causing the gaseous fuel control valve 41 to advance a richer mixture to the intake conduit 38.

The combustion of the gaseous fuel, air, and pilot fuel advances the engine assembly 10 to the power stroke in which the intake valve 48 and the exhaust valve 56 are both positioned in their respective closed positions. As the gaseous fuel, air, and pilot fuel are combusted, exhaust gases are formed. The formation of exhaust gases generates pressure which acts upon the piston 40 to drive the piston 40 in the general direction of arrow 44. Movement of the piston 40 in the general direction of arrow 44 causes the crankshaft 50 to rotate in the general direction of arrow 51.

Thereafter, the engine assembly 10 is advanced to an exhaust stroke during which the exhaust valve 56 is positioned in the open position and the intake valve 48 is positioned in the closed position. Since the pressure generated by formation of exhaust gases in the combustion chamber 46 is greater than the pressure in the exhaust conduit 55, the exhaust gases advance from the combustion chamber 46, through the exhaust port 36, through the exhaust passage 52, through the exhaust manifold 54, and into the exhaust conduit 55. From the exhaust conduit 55, exhaust gases are advanced to a turbocharger (not shown) prior to being exhausted to the atmosphere.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, although the oxygen sensor 82 is described herein as is positioned in the exhaust conduit 55 to measure residual oxygen from the combustion process, and has significant advantages thereby in the present invention, an ionization sensor could be position in the combustion chamber 46 to monitor the combustion process.

What is claimed is:

1. A method of operating an engine assembly having a cylinder assembly which defines a combustion chamber and includes (i) an engine block having a piston cylinder defined therein, (ii) a piston which translates in the piston cylinder, (iii) a crankshaft which is mechanically coupled to the piston, (iv) an exhaust conduit in fluid communication with the combustion chamber, and (v) a $NO_X$ sensor positioned to measure $NO_X$ content of exhaust gases in the exhaust conduit, comprising the steps of:

performing an intake stroke of the engine assembly;

advancing gaseous fuel and air into the combustion chamber during the intake stroke performing step;

performing a compression stroke of the engine assembly after the intake stroke performing step;

injecting a pilot fuel into the combustion chamber during the compression stroke while the crankshaft is positioned at about X degrees before top dead center, wherein $21.0 < X < 28.0$;

combusting the pilot fuel in the combustion chamber during the compression stroke performing step so as to ignite the gaseous fuel;

performing an exhaust stroke of the engine assembly after the compression stroke performing step so as to advance exhaust gases from the combustion chamber to the exhaust conduit;

measuring $NO_X$ content of exhaust gases in the exhaust conduit after the exhaust stroke performing step to obtain a measured $NO_X$ value; and adjusting timing of when the pilot fuel is injected into the combustion chamber during a subsequent compression stroke based on the measured $NO_X$ value.

2. The method of claim 1, further comprising the step of:

preventing injection of the pilot fuel into the combustion chamber during the compression stroke while the crankshaft moves from about 20.0 degrees before top dead center to about 0.0 degrees before top dead center.

3. The method of claim 2, wherein the pilot fuel injection step begins when the crankshaft is positioned at about 27.0 degrees before top dead center.

4. The method of claim 1, wherein:

the engine assembly further includes a vibration sensor positioned to measure vibrations in the combustion chamber, and the pilot fuel injecting step further includes the steps of (i) sensing when the cylinder assembly is operating in an abnormal mode of operation with the vibration sensor and generating an abnormal control signal in response thereto, and (ii) adjusting an amount of pilot fuel advanced into the combustion chamber during the subsequent compression stroke of the third cycle of the engine assembly in response to generation of the abnormal control signal.

5. The method of claim 1, wherein:

the engine assembly further includes a vibration sensor positioned to measure vibrations in the combustion chamber, and the pilot fuel injecting step further includes the steps of (i) sensing when the cylinder assembly is operating in an abnormal mode of operation with the vibration sensor and generating an abnormal control signal in response thereto, and (ii) adjusting timing of when the pilot fuel is injected into the combustion chamber during the subsequent compression stroke of the third cycle of the engine assembly in response to generation of the abnormal control signal.

6. A method of operating an engine assembly having a cylinder assembly which defines a combustion chamber and includes (i) an engine block having a piston cylinder defined therein, (ii) a piston which translates in the piston cylinder, (iii) a crankshaft which is mechanically coupled to the piston, (iv) an exhaust conduit in fluid communication with the combustion chamber and (v) a $NO_X$ sensor positioned to measure $NO_X$ content of exhaust gases in the exhaust conduit, comprising the steps of:

performing an intake stroke of the engine assembly;

advancing gaseous fuel and air into the combustion chamber during the intake stroke performing step;

performing a compression stroke of the engine assembly after the intake stroke performing step;

injecting a pilot fuel into the combustion chamber during the compression stroke while the crankshaft is positioned at about X degrees before top dead center, wherein $21.0 < X < 28.0$;

combusting the pilot fuel in the combustion chamber during the compression stroke performing step so as to ignite the gaseous fuel;

performing a first exhaust stroke of the engine assembly during a first cycle of the engine assembly so as to advance first exhaust gases from the combustion chamber to the exhaust conduit;

measuring $NO_X$ content of the first exhaust gases in the exhaust conduit after the first exhaust stroke performing step to obtain a first measured $NO_X$ value;

performing a second exhaust stroke of the engine assembly during a second cycle of the engine assembly so as to advance second exhaust gases from the combustion chamber to the exhaust conduit;

measuring $NO_X$ content of the second exhaust gases in the exhaust conduit after the second exhaust stroke performing step to obtain a second measured $NO_X$ value;

if the first measured $NO_X$ value has a first predetermined relationship to the second measured $NO_X$ value, then maintaining timing of when the pilot fuel is injected into the combustion chamber during a subsequent compression stroke of a third cycle of the engine assembly; and if the first measured $NO_X$ value has a second predetermined relationship to the second measured $NO_X$ value, then adjusting timing of when the pilot fuel is injected into the combustion chamber during the subsequent compression stroke of the third cycle of the engine assembly.

7. The method of claim 6, wherein the timing adjusting step includes the step of advancing timing of when the pilot fuel is injected into the combustion chamber during the subsequent compression stroke of the third cycle of the engine assembly.

8. The method of claim 6, wherein the timing adjusting step includes the step of retarding timing of when the pilot fuel is injected into the combustion chamber during the subsequent compression stroke of the third cycle of the engine assembly.

9. A method of operating an engine assembly having (i) a cylinder assembly which defines a combustion chamber and includes (A) an engine block having a piston cylinder defined therein, (B) a piston which translates in the piston cylinder, and (C) a crankshaft which is mechanically coupled to the piston, (ii) an exhaust conduit in fluid communication with the combustion chamber, and (iii) a $NO_X$ sensor positioned to measure $NO_X$ content of exhaust gases in the exhaust conduit, comprising the steps of:

performing an intake stroke of the cylinder assembly;

advancing gaseous fuel and air into the combustion chamber during the intake stroke performing step;

performing a compression stroke of the engine assembly after the intake stroke performing step;

injecting a pilot fuel into the combustion chamber during the compression stroke;

combusting the pilot fuel in the combustion chamber during the compression stroke performing step so as to ignite the gaseous fuel;

performing a first exhaust stroke of the engine assembly during a first cycle of the engine assembly so as to advance first exhaust gases from the combustion chamber to the exhaust conduit;

measuring $NO_X$ content of the first exhaust gases in the exhaust conduit after the first exhaust stroke performing step to obtain a first measured $NO_X$ value;

performing a second exhaust stroke of the engine assembly during a second cycle of the engine assembly so as to advance second exhaust gases from the combustion chamber to the exhaust conduit;

measuring $NO_X$ content of the second exhaust gases in the exhaust conduit after the second exhaust stroke performing step to obtain a second measured $NO_X$ value;

if the first measured $NO_X$ value has a first predetermined relationship to the second measured $NO_X$ value, then maintaining timing of when the pilot fuel is injected into the combustion chamber during a subsequent compression stroke of a third cycle of the engine assembly; and if the first measured $NO_X$ value has a second predetermined relationship to the second measured $NO_X$ value, then adjusting timing of when the pilot fuel is injected into the combustion chamber during the subsequent compression stroke of the third cycle of the engine assembly.

10. The method of claim 9, wherein the timing adjusting step includes the step of advancing timing of when the pilot fuel is injected into the combustion chamber during the subsequent compression stroke of the third cycle of the engine assembly.

11. The method of claim 9, wherein the timing adjusting step includes the step of retarding timing of when the pilot fuel is injected into the combustion chamber during the subsequent compression stroke of the third cycle of the engine assembly.

12. The method of claim 9, wherein:

the engine assembly further includes a vibration sensor positioned to measure vibrations in the combustion chamber, and the pilot fuel injecting step further includes the steps of (i) sensing when the cylinder assembly is operating in an abnormal mode of operation with the vibration sensor and generating an abnormal control signal in response thereto, and (ii) adjusting an amount of pilot fuel advanced into the combustion chamber during the subsequent compression stroke of the third cycle of the engine assembly in response to generation of the abnormal control signal.

13. The method of claim 9, wherein:

the engine assembly further includes a vibration sensor positioned to measure vibrations in the combustion chamber, and the pilot fuel injecting step further includes the steps of (i) sensing when the cylinder assembly is operating in an abnormal mode of operation with the vibration sensor and generating an abnormal control signal in response thereto, and (ii) adjusting timing of when the pilot fuel is injected into the combustion chamber during the subsequent compression stroke of the third cycle of the engine assembly in response to generation of the abnormal control signal.

14. The method of claim 9, further comprising the step of:
preventing injection of the pilot fuel into the combustion chamber during the compression stroke while the crankshaft moves from about 20.0 degrees before top dead center to about 0.0 degrees before top dead center.

15. The method of claim 9, wherein the pilot fuel injection step begins when the crankshaft is positioned at about 27.0 degrees before top dead center.

16. An engine assembly comprising:
a cylinder assembly which includes (i) an engine block having a piston cylinder defined therein (ii) an engine head secured to said engine block, and (iii) a piston which translates within said piston cylinder, wherein said engine block, said engine head, and said piston cooperate to define a combustion chamber;
an exhaust conduit positioned in fluid communication with said combustion chamber during an exhaust stroke of said engine assembly;
a gaseous fuel source positioned in fluid communication with said combustion chamber during an intake stroke of said engine assembly;
a fuel injector positioned in said engine head and operable to inject pilot fuel into said combustion chamber during a compression stroke of said engine assembly;
a $NO_x$ sensor (i) positioned to measure $NO_x$ content of exhaust gases advanced from said combustion chamber to said exhaust conduit during an exhaust stroke of said engine assembly, and (ii) operable to generate a plurality of measured $NO_x$ signals in response to sensing $NO_x$ content of said exhaust gases; and
a controller which adjusts timing of when said fuel injector injects pilot fuel into said combustion chamber based on said plurality of measured $NO_x$ signals.

17. The engine assembly of claim 16, further comprising a crankshaft mechanically coupled to said piston,
wherein said controller is further operable to cause said fuel injector to inject pilot fuel into said combustion chamber during said compression stroke while said crankshaft is positioned at about X degrees before top dead center, wherein $21.0 < X < 28.0$.

18. The engine assembly of claim 17, wherein said controller is further operable to prevent said fuel injector from injecting pilot fuel into said combustion chamber during said compression stroke while said crankshaft moves from about 20.0 degrees before top dead center to about 0.0 degrees before top dead center.

* * * * *